United States Patent
Ren et al.

(10) Patent No.: US 11,789,778 B2
(45) Date of Patent: Oct. 17, 2023

(54) FPGA CLOUD PLATFORM ACCELERATION RESOURCE ALLOCATION METHOD, AND SYSTEM

(71) Applicant: Inspur Suzhou Intelligent Technology Co., Ltd., Suzhou (CN)

(72) Inventors: Zhixin Ren, Suzhou (CN); Jiaheng Fan, Suzhou (CN)

(73) Assignee: Inspur Suzhou Intelligent Technology Co., Ltd., Suzhou (CN)

( * ) Notice: Subject to any disclaimer, the term of this patent is extended or adjusted under 35 U.S.C. 154(b) by 27 days.

(21) Appl. No.: 17/761,421

(22) PCT Filed: Dec. 30, 2019

(86) PCT No.: PCT/CN2019/130083
§ 371 (c)(1),
(2) Date: Mar. 17, 2022

(87) PCT Pub. No.: WO2021/051714
PCT Pub. Date: Mar. 25, 2021

(65) Prior Publication Data
US 2022/0413918 A1 Dec. 29, 2022

(30) Foreign Application Priority Data

Sep. 21, 2019 (CN) .......................... 201910895899.0

(51) Int. Cl.
*G06F 9/50* (2006.01)
*G06F 9/38* (2018.01)

(52) U.S. Cl.
CPC .......... *G06F 9/5016* (2013.01); *G06F 9/3877* (2013.01); *G06F 9/5072* (2013.01)

(58) Field of Classification Search
CPC .... G06F 9/5016; G06F 9/3877; G06F 9/5072; G06F 9/5083
See application file for complete search history.

(56) References Cited

U.S. PATENT DOCUMENTS

2015/0169376 A1 6/2015 Chang
2019/0050263 A1 2/2019 Patel
(Continued)

FOREIGN PATENT DOCUMENTS

CN 103577266 A 2/2014
CN 106681793 A 5/2017
(Continued)

OTHER PUBLICATIONS

Search Report and Written Opinion, PCT/CN2019/130083, dated Jun. 23, 2020.

*Primary Examiner* — Sisley N Kim
(74) *Attorney, Agent, or Firm* — David R. Stevens; Stevens Law Group

(57) ABSTRACT

An FPGA cloud platform acceleration resource allocates and coordinates accelerator card resources according to delays between a host of a user and FPGA accelerator cards deployed at various network segments. Upon an FPGA usage request of the user, allocating an FPGA accelerator card in an FPGA resource pool that has a minimum delay to the host. A cloud monitoring management platform obtains_transmission delays to a virtual machine network according to different geographic locations of various FPGA cards in the FPGA resource pool, and allocating a card having a minimum delay to each user. The cloud monitoring management platform prevents unauthorized users from accessing acceleration resources in the resource pool. The invention protects FPGA accelerator cards that are not authorized for users, and ensures that the card allocated to a user has a minimum network delay, thereby optimizing acceleration performance, and improving user experience.

8 Claims, 2 Drawing Sheets

(56) References Cited

U.S. PATENT DOCUMENTS

| | | | |
|---|---|---|---|
| 2019/0146829 A1* | 5/2019 | Cheng | G06F 15/7871 718/108 |
| 2020/0326992 A1* | 10/2020 | Jin | G06F 9/5083 |
| 2021/0144517 A1* | 5/2021 | Guim Bernat | H04W 12/04 |
| 2022/0124009 A1* | 4/2022 | Metsch | H04L 47/72 |

FOREIGN PATENT DOCUMENTS

| | | |
|---|---|---|
| CN | 108829512 A | 11/2018 |
| CN | 109976912 A | 7/2019 |
| WO | WO2019027554 A1 | 2/2019 |

* cited by examiner

FPGA CLOUD PLATFORM ACCELERATION RESOURCE ALLOCATION METHOD, AND SYSTEM

CROSS REFERENCE TO RELATED APPLICATIONS

This application claims priority of Chinese Patent Application No. 201910895899.0, filed to China National Intellectual Property Administration on Sep. 21, 2019, entitled "FPGA CLOUD PLATFORM ACCELERATION RESOURCE ALLOCATION METHOD AND SYSTEM", the entire contents of which are incorporated herein by reference.

TECHNICAL FIELD

The present disclosure relates to the technical field of a data center, and particularly relates to a Field Programmable Gate Array (FPGA) cloud platform acceleration resource allocation method and system.

BACKGROUND

With rapid development of "Cloud Data Intelligence", the data volume sharply expands, and the demands of a data center for computation are also rapidly increased. The computation demands of deep learning in various applications such as video transcoding, image compression and decompression, and gene detection have far exceeded the capability of a conventional CPU.

In order to make up the gap between the demands and performance, it has begun to promote processing performance through hardware acceleration, i.e., in a mode of heterogeneous computing using special coprocessors, in the industry. With continuous enhancement of the processing capacity of an FPGA, more and more data centers start to use the FPGA to carry out acceleration, for example, data centers of companies, such as Microsoft, Amazon and BAT, deploy FPGA computing cards in a large scale to simultaneously improve powerful computing capacity and enough flexibility. In order to manage these FPGA acceleration cards with increasing quantity and types, an FPGA platform emerges to be expected to solve the problem of difficulty in deployment, maintenance and management of the FPGA acceleration cards, which is faced by current enterprises. Under the management of the cloud platform, a complex computing task is allocated to a certain FPGA or some FPGAs in an FPGA resource pool to carry out acceleration, and data transmission between the acceleration cards is carried out through the Ethernet.

In the prior art, with respect to a single-machine single-card or single-machine multi-card use scenario (each server is allocated with one or more FPGA acceleration cards), the problems of resource management and scheduling do not occur, and an accelerating task of a Central Processing Unit (CPU) can be directly unloaded to the acceleration cards. Whereas, with respect to the currently emerging FPGA cloud platform scenario, a plurality of boards are deployed inside one FPGA enclosure, and a resource management platform carries out allocation as required according to the current FPGA resource use and occupation conditions.

An existing solution is suitable in the current scenario where the scale of the FPGA acceleration cards is not big and all resources carry out data exchange in one cabinet or through one network switch. However, as the quantity of the FPGA acceleration cards is continuously increased and the geographic position of the data center is changed, thousands of boards are deployed in different enclosures, different computer rooms may have different degrees of network delays, and it is expected to more rapidly obtain a computing result by using the FPGA to carry out acceleration. In a case of the same computing capacity, a user certainly hopes to select the acceleration card with the minimum network transmission delay to carry out the accelerating task so as to obtain the best accelerating effect.

SUMMARY

An objective of the present disclosure is to provide an FPGA cloud platform acceleration resource allocation method and system, which aims to solve the problem that in the prior art, different network delays are caused by numerous FPGA acceleration cards to result in a poor accelerating effect, and implement a case of ensuring that a board allocated to a user has the minimum network delay to achieve the optimal accelerating effect, thereby promoting user experience.

For achieving the above technical objective, the present disclosure provides an FPGA cloud platform acceleration resource allocation method, including the following steps:

S1: requesting to use an FPGA acceleration card by a user to initiate a resource allocation request to a cloud monitoring management platform;

S2: notifying a virtual machine of sending a data packet only for testing a delay in a broadcasting mode by the cloud monitoring management platform;

S3: identifying the data packet by the FPGA acceleration card in a resource pool, and feeding FPGA identification information back to the virtual machine which initiates the broadcasting of the data packet;

S4: writing, by the virtual machine, the FPGA identification information fed back into a memory cache in order, storing a feedback data packet which responds first to a first position in a queue, and feeding the feedback data packet back to the cloud monitoring management platform; and S5: parsing the feedback data packet by the cloud monitoring management platform according to a protocol, acquiring information of an FPGA board having the minimum network delay with the virtual machine, generating an authorization file which is sent to the user, and then operating the FPGA board by the user according to the authorization file.

Preferably, the FPGA identification information includes a virtual ID and a virtual physical address.

Preferably, when the FPGA acceleration card is in a non-idle state, the data packet which is sent by the virtual machine and is for testing the delay is discarded without response.

Preferably, the memory cache is a First In First Out (FIFO) cache.

The present disclosure further provides an FPGA cloud platform acceleration resource allocation system, including:

a resource request module, configured to request, by a user, to use an FPGA acceleration card to initiate a resource allocation request to a cloud monitoring management platform;

a test data sending module, configured to notify, by the cloud monitoring management platform, a virtual machine of sending a data packet only for testing a delay in a broadcasting mode;

an FPGA feedback module, configured to identify the data packet by the FPGA acceleration card in a resource pool and feed FPGA identification information back to the virtual machine which initiates the broadcasting of the data packet;

a minimum delay determination module, configured to write, by the virtual machine, the FPGA identification information fed back into a memory cache in order, store a feedback data packet which responds first to a first position in a queue, and feed the feedback data packet to the cloud monitoring management platform; and an authorization module, configured to parse the feedback data packet by the cloud monitoring management platform according to a protocol, acquire information of an FPGA board having the minimum network delay with the virtual machine, generate an authorization file which is sent to the user, and operate the FPGA board by the user according to the authorization file.

Preferably, the FPGA identification information includes a virtual ID and a virtual physical address.

Preferably, when the FPGA acceleration card is in a non-idle state, the data packet which is sent by the virtual machine and is for testing the delay is discarded without response.

Preferably, the memory cache is an FIFO cache.

The effects provided in the summary are merely effects of the embodiments, but not all effects of the present disclosure, and one of the above technical solutions has the following advantages or beneficial effects compared with the prior art:

with respect to the FPGA acceleration cards deployed in a large scale, acceleration card resources are allocated and coordinated according to delays between a user host and the FPGA acceleration cards deployed in each network segment, and when the user applies to use an FPGA, the FPGA acceleration card having the minimum delay with the host in the FPGA resource pool is allocated to the user so as to implement allocation of acceleration resources of an FPGA cloud platform; the cloud monitoring management platform can obtain the transmission delay with a virtual machine network according to different geographic positions of the FPGA boards in the FPGA resource pool, and the board having the minimum delay can be allocated to each user for use so as to achieve the optimal accelerating effect; and in addition, unauthorized users can be effectively prevented from randomly accessing the acceleration resources in the resource pool, and the effective rights of an owner of the resource pool are protected. According to the present disclosure, not only are the FPGA acceleration cards which are not authorized to be used by the user effectively protected, but also the minimum network delay of the board allocated to the user can be guaranteed, so that the optimal acceleration effect is achieved, thereby improving the user experience.

DETAILED DESCRIPTION

Figure 1:
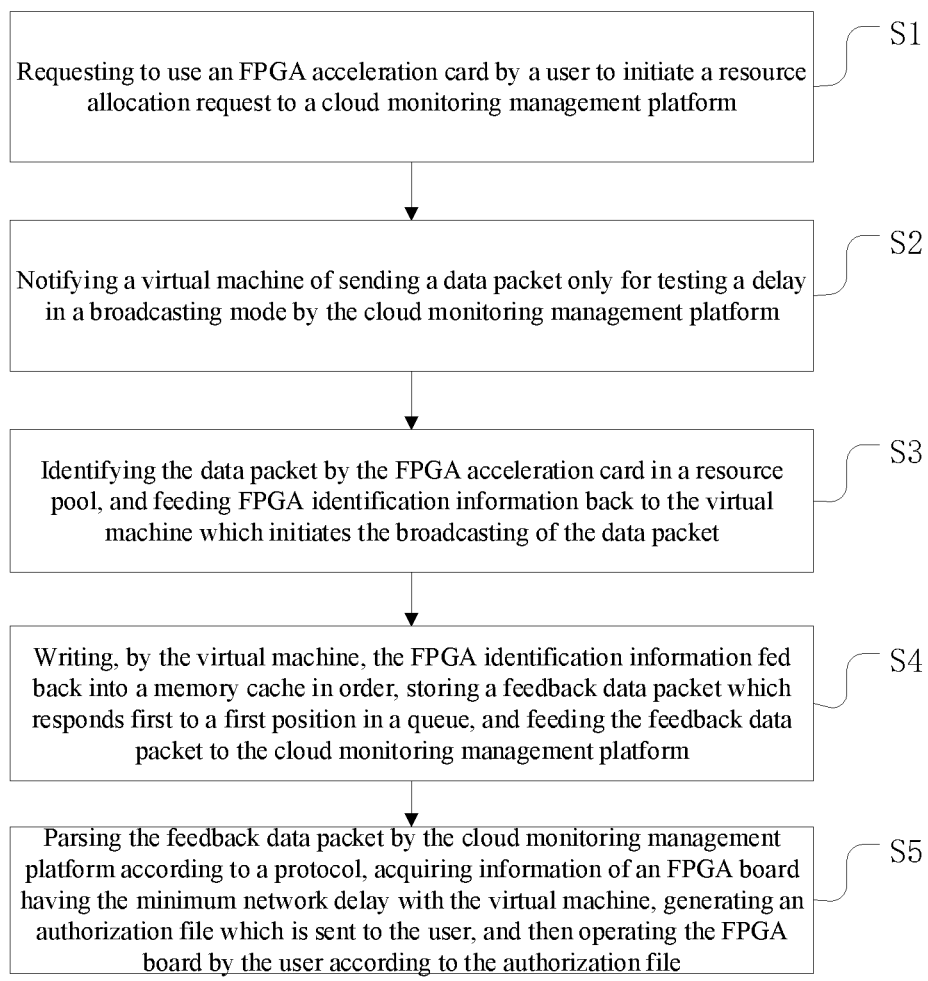
FIG. 1 is a flow chart of an FPGA cloud platform acceleration resource allocation method provided by an embodiment of the present disclosure.

In order to clearly illustrate the technical features of the solutions, the present disclosure will be described in detail through the specific embodiments in combination with the drawings. The disclosure below provides many different embodiments or examples for implementing different structures of the present disclosure. In order to simplify the present disclosure, parts and settings of specific examples are described hereinafter. In addition, according to the present disclosure, reference numerals and/or letters can be repeated in different examples. Such repetition aims at simplification and clarity, but does not indicate the relationship between various discussed embodiments and/or settings. It should be noted that parts shown in the drawings are not necessarily drawn in proportion. The present disclosure omits description on known assemblies and processing technologies as well as processes so as to avoid unnecessary limitation to the present disclosure.

An FPGA cloud platform acceleration resource allocation method and system provided by embodiments of the present disclosure will be illustrated in detail below in combination with the drawings.

As shown in FIG. 1, the present disclosure discloses an FPGA cloud platform acceleration resource allocation method, including the following steps:

S1: requesting to use an FPGA acceleration card by a user to initiate a resource allocation request to a cloud monitoring management platform;

S2: notifying a virtual machine of sending a data packet only for testing a delay in a broadcasting mode by the cloud monitoring management platform;

S3: identifying the data packet by the FPGA acceleration card in a resource pool, and feeding FPGA identification information back to the virtual machine which initiates the broadcasting of the data packet;

S4: writing, by the virtual machine, the FPGA identification information fed back into a memory cache in order, storing a feedback data packet which responds first to a first position in a queue, and feeding the feedback data packet back to the cloud monitoring management platform; and S5: parsing the feedback data packet by the cloud monitoring management platform according to a protocol, acquiring information of an FPGA board having the minimum network delay with the virtual machine, generating an authorization file which is sent to the user, and then operating the FPGA board by the user according to the authorization file.

In the embodiment of the present disclosure, with respect to the FPGA acceleration cards deployed in a large scale, acceleration card resources are allocated and coordinated according to delays between a user host and FPGA acceleration cards deployed in each network segment, and when the user applies to use an FPGA, the FPGA acceleration card at the minimum "distance" with the host in the FPGA resource pool is allocated to the user so as to solve the problem of allocation according to needs at present.

Usually, a computer processor is connected with the FPGA-based acceleration card through a Peripheral Component Interface Express (PCIe) interface, in a data center of large-scale FPGA boards, data exchange between the host and the FPGA acceleration cards and between the acceleration cards is carried out through the Ethernet, and the user accesses the FPGA acceleration cards in the resource pool through the virtual machine in the data center.

The user accesses an FPGA device in an FPGA cloud platform resource pool at the vertical machine end through the Ethernet, and a user side passively receives a device allocated by the monitoring management platform, so that a manager of a cloud platform, i.e., a cloud platform management server, needs to allocate the most suitable device to the user according to the network address of the host serving as the virtual machine and the idle FPGA device in the resource pool.

When all FPGA resources are distributed in one enclosure and data exchange is carried out through a network switch, the network delays are roughly the same, and idle FPGA boards capable of meeting demands of user logic resources can be randomly allocated to the user; and when the FPGA resource pool is continuously expanded, the FPGA resources are distributed in different enclosures, and different switches are required for communication, so that the network delay becomes one non-negligible factor. According to the embodiment of the present disclosure, by testing the network delay, FPGA resource allocation is carried out according to the network delay.

The cloud monitoring management platform manages the use condition of all the FPGA acceleration cards and detail information of the boards, including an Internet Protocol (IP), a physical address, a board ID and the like, and when the user requests to use the FPGA board, the user can initiate the resource allocation request to the cloud monitoring management platform.

The cloud monitoring management platform which receives the request notifies the virtual machine of sending the special data packet which can only be configured to test the delay in a broadcasting mode, and then all the FPGA boards in the network segment can receive the data packet.

The FPGA in the resource pool can identify the broadcast data packet and directly feed information including a virtual ID and a virtual physical address of the FPGA back to a server which initiates broadcasting without any data layer parsing after receiving the broadcast data packet, and if there is an acceleration card in a non-idle state, the acceleration card may discard the data packet without response.

The virtual machine writes all the received feedback packets into an FIFO cache developed in the memory in order, according to the FIFO characteristic, the data packet which responds first is stored to the first position in the queue, and the vertical machine feeds the packet back to the cloud monitoring management platform.

The cloud monitoring management platform decodes the virtual ID and the virtual physical address according to the protocol so as to acquire information of the board having the minimum network delay with the virtual machine, finally, the authorization file generated from the information of the board is sent to the user, and after acquiring the authorization file, the user can really operate the FPGA and utilize the resource of the FPGA to carry out acceleration.

In the interaction process, the user exchanges data with an unauthorized board through the virtual machine, but all the information is encrypted, the user just sees numbers which have no any actual meaning, before the authorization file is acquired, except for the test packet for testing the delay, the FPGA in the resource pool cannot respond to any operation of any unauthorized user, and an encryption protocol and a broadcast packet protocol for testing are self-defined by the cloud monitoring management platform and an owner of the FPGA resources.

In the embodiment of the present disclosure, with respect to the FPGA acceleration cards deployed in a large scale, the acceleration card resources are allocated and coordinated according to the delays between the user host and the FPGA acceleration cards deployed in each network segment, and when the user applies to use the FPGA, the FPGA acceleration card having the minimum delay with the host in the FPGA resource pool is allocated to the user so as to implement allocation of acceleration resources of an FPGA cloud platform; the cloud monitoring management platform can obtain the transmission delay with a virtual machine network according to different geographic positions of the various FPGA boards in the FPGA resource pool, and allocate the board with the minimum delay to each user for use so as to achieve the optimal accelerating effect; and in addition, the unauthorized users can be effectively prevented from randomly accessing the acceleration resources in the resource pool, and the effective rights of the owner of the resource pool are protected. According to the present disclosure, not only are the FPGA acceleration cards which are not authorized to be used by the user effectively protected, but also the minimum network delay of the board allocated to the user can be guaranteed, so that the optimal acceleration effect is achieved, thereby improving the user experience.

Figure 2:
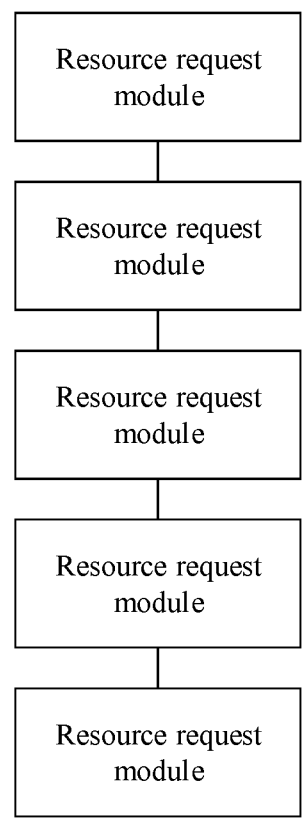
FIG. 2 is a block diagram of an FPGA cloud platform acceleration resource allocation system provided by an embodiment of the present disclosure.

As shown in FIG. 2, an embodiment of the present disclosure further discloses an FPGA cloud platform acceleration resource allocation system, including:

a resource request module, configured to request, by a user, to use an FPGA acceleration card to initiate a resource allocation request to a cloud monitoring management platform;

a test data sending module, configured to notify, by the cloud monitoring management platform, a virtual machine of sending a data packet only for testing a delay in a broadcasting mode;

an FPGA feedback module, configured to identify the data packet by the FPGA acceleration card in a resource pool and feed FPGA identification information back to the virtual machine which initiates the broadcasting of the data packet;

a minimum delay determination module, configured to write, by the virtual machine, the FPGA identification information fed back into a memory cache in order, store a feedback data packet which responds first to a first position in a queue, and feed the feedback data packet back to the cloud monitoring management platform; and an authorization module, configured to parse the feedback data packet by the cloud monitoring management platform according to a protocol, acquire information of an FPGA board having the minimum network delay with the virtual machine, generate an authorization file which is sent to the user, and operate the FPGA board by the user according to the authorization file.

The cloud monitoring management platform manages the use condition of all the FPGA acceleration cards and detail information of the boards, including an IP, a physical address, a board ID and the like, and when the user requests to use the FPGA board, the user can initiate the resource allocation request to the cloud monitoring management platform.

The cloud monitoring management platform which receives the request notifies the virtual machine of sending a special data packet which can only be configured to test the delay in a broadcasting mode, and then all the FPGA boards in the network segment can receive the data packet.

The FPGA in the resource pool can identify the broadcast data packet and directly feed information including a virtual ID and a virtual physical address of the FPGA back to a server which initiates the broadcasting without any data layer parsing after receiving the broadcast data packet, and if there is an acceleration card in a non-idle state, the acceleration card discards the data packet without response.

The virtual machine writes all the received feedback packets into an FIFO cache developed in the memory in order, according to the FIFO characteristic, the data packet which responds first is stored to the first position in the queue, and the vertical machine feeds the packet back to the cloud monitoring management platform.

The cloud monitoring management platform decodes the virtual ID and the virtual physical address according to the protocol so as to acquire the information of the board having the minimum network delay with the virtual machine, finally, the authorization file generated from the information of the board is sent to the user, and after acquiring the authorization file, the user can really operate the FPGA and utilize the resource of the FPGA to carry out acceleration.

In the interaction process, the user exchanges data with the unauthorized board through the virtual machine, but all the information is encrypted, the user just sees numbers which have no any actual meaning, before the authorization file is acquired, except for the test packet for testing the delay, the FPGA in the resource pool cannot respond to any operation of any unauthorized user, and an encryption protocol and a broadcast packet protocol for testing are self-defined by the cloud monitoring management platform and an owner of the FPGA resources.

The above are only the preferred embodiments of the present disclosure and not intended to limit the present disclosure, and any modifications, equivalent replacements, improvements and the like within the spirit and principle of the present disclosure shall fall within the scope of protection of the present disclosure.

What is claimed is:

1. A Field Programmable Gate Array (FPGA) cloud platform acceleration resource allocation method, comprising the following steps:
   S1: requesting to use an FPGA acceleration card by a user to initiate a resource allocation request to a cloud monitoring management platform;
   S2: notifying a virtual machine of sending a data packet only for testing a delay in a broadcasting mode by the cloud monitoring management platform;
   S3: identifying the data packet by an FPGA acceleration card in a resource pool, and feeding FPGA identification information back to the virtual machine which initiates the broadcasting of the data packet;
   S4: writing, by the virtual machine, the FPGA identification information fed back into a memory cache in order, storing a feedback data packet which responds first to a first position in a queue, and feeding the feedback data packet back to the cloud monitoring management platform; and
   S5: parsing the feedback data packet by the cloud monitoring management platform according to a protocol, acquiring information of an FPGA board having the minimum network delay with the virtual machine, generating an authorization file which is sent to the user, and then operating the FPGA board by the user according to the authorization file.

2. The FPGA cloud platform acceleration resource allocation method according to claim 1, wherein, the FPGA identification information comprises a virtual ID and a virtual physical address.

3. The FPGA cloud platform acceleration resource allocation method according to claim 1, wherein, when the FPGA acceleration card is in a non-idle state, the data packet which is sent by the virtual machine and is for testing the delay is discarded without response.

4. The FPGA cloud platform acceleration resource allocation method according to claim 1, wherein, the memory cache is a First In First Out (FIFO) cache.

5. An FPGA cloud platform acceleration resource allocation system, comprising:
   a resource request module, configured to request, by a user, to use an FPGA acceleration card to initiate a resource allocation request to a cloud monitoring management platform;
   a test data sending module, configured to notify, by the cloud monitoring management platform, a virtual machine of sending a data packet only for testing a delay in a broadcasting mode;
   an FPGA feedback module, configured to identify the data packet by an FPGA acceleration card in a resource pool and feed FPGA identification information back to the virtual machine which initiates the broadcasting of the data packet;
   a minimum delay determination module, configured to write, by the virtual machine, the FPGA identification information fed back into a memory cache in order, store a feedback data packet which responds first to a first position in a queue, and feed the feedback data packet back to the cloud monitoring management platform; and
   an authorization module, configured to parse the feedback data packet by the cloud monitoring management platform according to a protocol, acquire information of an FPGA board having the minimum network delay with the virtual machine, generate an authorization file which is sent to the user, and operate the FPGA board by the user according to the authorization file.

6. The FPGA cloud platform acceleration resource allocation system according to claim 5, wherein, the FPGA identification information comprises a virtual ID and a virtual physical address.

7. The FPGA cloud platform acceleration resource allocation system according to claim 5, wherein, when the FPGA acceleration card is in a non-idle state, the data packet which is sent by the virtual machine and is for testing the delay is discarded without response.

8. The FPGA cloud platform acceleration resource allocation system according to claim 5, wherein, the memory cache is an FIFO cache.

* * * * *